Feb. 17, 1970   J. C. NEEDHAM   3,496,330
ARC WELDING
Filed May 26, 1966   3 Sheets-Sheet 1
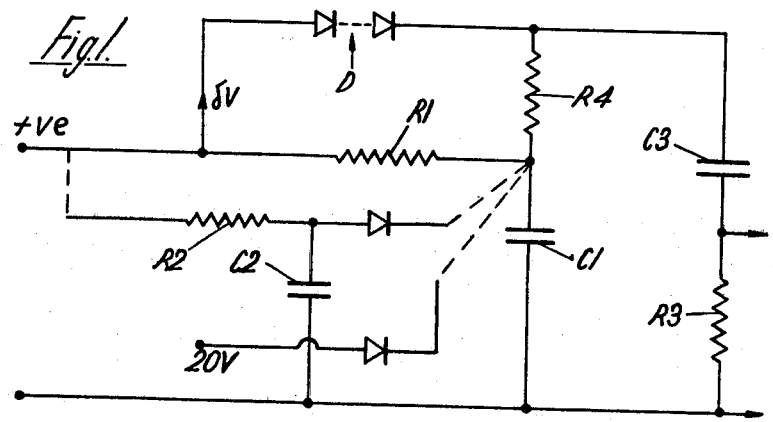
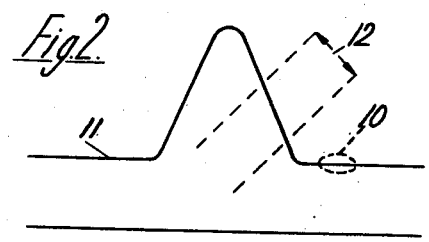
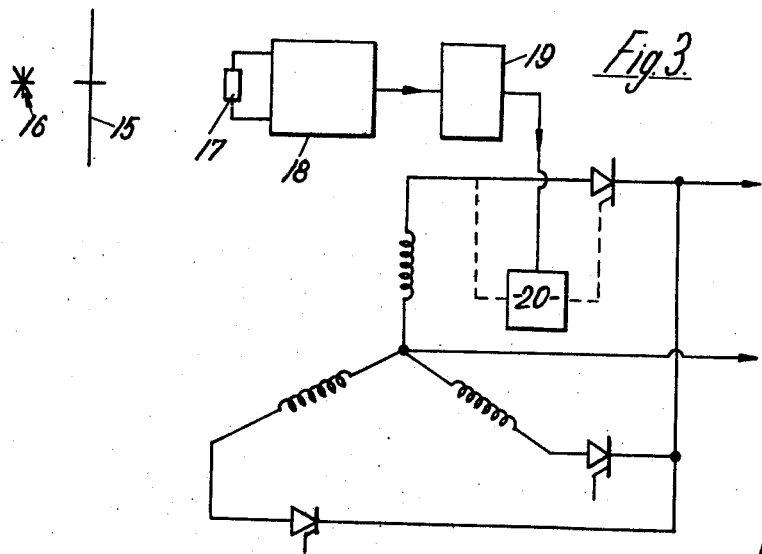
Inventor
James C. Needham
By Kemon Palmer
Stewart & Estabrook
Attorneys Feb. 17, 1970  J. C. NEEDHAM  3,496,330
ARC WELDING Filed May 26, 1966  3 Sheets-Sheet 3

United States Patent Office 3,496,330
Patented Feb. 17, 1970

3,496,330
ARC WELDING
James C. Needham, Cambridge, England, assignor to British Welding Research Association, London, England, a body corporate of Great Britain
Filed May 26, 1966, Ser. No. 553,083
Claims priority, application Great Britain, May 27, 1965, 22,618/65
Int. Cl. B23k 9/00, 9/10
U.S. Cl. 219—137                          22 Claims

ABSTRACT OF THE DISCLOSURE

In pulsed current spray transfer consumable electrode welding, a range of pulse magnitudes is used which is large enough to ensure a single transfer per pulse but small enough to ensure that the single transfer takes place towards the end of the pulse or even after the termination of the pulse. This results in a decrease in spatter and an improvement in weld quality.

---

In the practice of pulsed current welding and allied processes where a consumable electrode is used in conjunction with a supply system that gives a modulated current, difficulty is encountered in achieving particular conditions since there is no simple definition of the degree of modulation or the magnitude of such pulse current supply required to give effective results. Various methods for producing a pulsed current supply have been suggested, for example, in my U.S. Patent No. 3,249,735, including the switching of the current between more than one level from a given source of supply or the switching in of effectively more than one source to feed the welding arc. Such switching can be effected, for example, by a simple contactor or rotary commutator or more elaborate electric and electronic methods resulting to a greater or lesser extent in a modulated or pulsed supply in place of a steady, unmodulated, operating level.

One of the desirable features of the use of pulsed supply is that each cycle of the waveform results in the specific transfer of a given quantity of the electrode material. For example, under suitable conditions, it can be arranged that a single droplet of liquid metal can be detached as a result of the pulsed current once every cycle of pulse operation. This achieves a high degree of uniformity of metal transfer and of characteristics of deposited metal such as, for example, heat input and penetration. The pulse-magnitude required for any specific condition or relationship between the transfer characteristics and the pulse current is at present determined by trial and error and can in fact only be resolved with the aid of such techniques as oscillographic recording and high speed photography of the transfer processes.

With low pulse magnitudes a desired feature such as the transfer of a droplet of metal with each pulse will not be achieved except possibly by chance, whilst high pulse magnitudes would result in transfer of several droplets resulting in increased spatter and possibly appreciable deterioration in the weld due to excessive arc forces. The most desirable pulse magnitude is not easily determined and in practice the pulse magnitude is arranged to be a controllable variable so that it may be adjusted by experience and investigation of welds produced with various magnitudes under corresponding conditions. The control may be in the form of a variable source of E.M.F. due to say a variable transformer or tappings on the appropriate source or due to a change in series impedance resulting in a change in current flow. It would clearly be highly advantageous if the desired pulse amplitude could be predetermined by reference to known or measurable properties so that the operating pulse conditions could be adequately monitored.

It has already been suggested that the pulse amplitudes in consumable electrode welding should exceed some transition current level at which the number of droplets transferred or the frequency of transfer increases sharply but, even insofar as such a requirement provides a minimum current level, it is not precise since in general there is no sharp transition in the transfer frequency with current, the two being inter-related by a continuous curve of increasing transfer frequency with increasing current, with the size of the droplets transferred continuously decreasing. Thus there is no clear cut transition but only a change in degree and any definition of the pulse current in terms of such a transition can in general only be vague and lacking in measurable means.

Notable exceptions to this general rule do exist, however. For example, in welding with aluminium in argon a form of transition is exhibited which has been well documented in the literature. In this case there is a major discontinuity as the electrode feed or burn off rate is varied characterised by a change in transfer type from large globules falling mainly under gravity to comparatively small droplets projected at appreciable velocity through the arc, this latter type of non-gravitational or normal spray transfer will be referred to as "natural" transfer. At a given feed rate, namely 120 inches/minute for 1/16 inch diameter wire, the change is from 1 to 2 transfers/second to 15 to 25, or some ten-fold increase in transfer frequency. This is a clear transition which is associated with a reasonably well defined electrode feed rate and does not occur at feed rates differing by more than about ±10% from this value, transfer being of the natural, small droplet, type at higher feed rates and the gravitational, large globular, type at the lower. A current change is associated with this transition and at the given feed rate of 120 inches/minute, the currents for gravitational and natural transfer being respectively about 95 to 135 amps. However, even the higher current value of 135 amps is not a reasonable guide to the pulse current required for producing enforced natural transfer since pulses of 135 amps magnitude or even 150 amps are quite useless in obtaining control of transfer where the pulses are of the form commonly practised at present, namely approximately half sine wave pulses of the power supply frequency.

According to a first aspect of the present invention, the welding arc is supplied with current pulses having peak values arranged to lie between a minimum value equal to the amplitude of the unmodulated current that would produce a natural transfer of droplets in which transfer of successive droplets would be separated by average intervals equal to the duration of the current pulses and a maximum value equal to the amplitude of the unmodulated current which would produce a natural transfer of droplets on an average at twice the frequency produced by an unmodulated current with an amplitude equal to the minimum value. It is necessary to determine the amplitudes of current with reference to average intervals between successive droplets since, when the arc current is unmodulated successive transfers may be separated by quite widely varying intervals. For example, where the average separation is of the order of 7 milliseconds, intervals from about 5 milliseconds to about 10 milliseconds duration may occur. However, provided the current and other arc conditions are kept uniform, a markedly long interval will probably be adjacent to a markedly short interval so that the average separation may be determined reasonably accurately from investigation of transfers over a short period of the order of a second.

These maximum and minimum values for the range of peak values for the pulsed current are in this way defined with reference to unmodulated current and therefore may be determined much more directly than by investigation of a weld and its characteristics, such as its penetration, or even from examining a welding arc. Furthermore, once these values have been determined for a particular electrode, workpiece and shielding gas combination they may be employed for the calculation of peak values for current pulses having a range of different durations.

However, in some cases the maximum and minimum values cannot be obtained simply by measurements with an unmodulated supply since at the appropriate current levels concerned the transfer mechanism may have changed in character. Examples are mild steel and other resistive materials where appreciable tapering of the electrode tip takes place as the current is increased so that the droplets are no longer forming from the full wire diameter so that the data is no longer strictly relevant. In such cases, values equivalent to the values defined above can be obtained using a pulsed current reference source in which the pulses are of substantially square waveform. An example of a suitable source is described in U.S. application Ser. No. 626,106 filed Mar. 27, 1967. The amplitude of the current pulse required to detach a droplet in an interval from the instant of initiation of the pulse equal to the duration of the current pulses to be supplied to the welding arc is then equivalent to the minimum value defined above but is measured under conditions where distortion of the wire tip and/or other variations of the transfer mechanism do not occur. Similarly the amplitude of the current pulse required to detach a droplet in an interval of one half of that duration is equivalent to the maximum value defined above. The use of such a method employing a pulsed source of substantially square waveform, though less simple than the use of the former method employing unmodulated current has the same advantages as that former method in that values, once determined, may be used to calculate the peak value ranges required with a selection of different pulse sources for particular metal gas combinations.

The half sine wave current pulses derived from a mains supply of alternating current of 50 periods per second have a maximum possible pulse duration of 10 milliseconds. In practice under preferred operating conditions, where the pulse supply is of relatively low open circuit voltage and the output is superimposed on a background level, insufficient to produce transfer in the periods for which it is effective by itself, and in which the voltage of the pulse supply does not greatly exceed that of the welding arc, the actual duration of the current pulse is appreciably less than the theoretical maximum and is often of the order of two thirds of this value, namely 7 milliseconds. Thus the minimum peak value of such current pulses supplied to the welding arc in a method embodying the present invention would be equal to that unmodulated current which would cause an average transfer frequency of the order of 150 droplets per second. This current which will be referred to as $I_f$ where the subscript $f$ represents the frequency given by the reciprocal of the duration of the pulses supplied to the welding arc (which as stated above is of the order of two thirds of the duration of a half cycle of the power supply for simple sinusoidal type pulse currents), represents a limit below which the peak of the pulse current must not fall. Using the same notation the upper limit to the pulse current can be defined as not exceeding $I_{2f}$ or the amplitude of unmodulated current producing transfer at a frequency equal to twice the frequency $f$ defined above. For an approximately sinusoidal wave shaped modulation of the arc current this range can with advantage be arranged to be not less than 1.1 $I_f$ and not greater than say, 0.9 $I_{2f}$. An equivalent way of expressing the required amplitude of the current peak in terms of $I_f$ alone is that it should be not less than 1.1 $I_f$ and not greater than 1.4 $I_f$. In determining the current corresponding to a particular average transfer frequency it is observed that the frequency increases very rapidly with current in such ranges and for example the amplitude $I_{2f}$ may not exceed the amplitude $I_f$ by more than 50 to 70 amps. The quoted limits, therefore, provide measurable boundaries for the desired peak pulse current within reasonably close limits so that the optimum operation within such limits is readily established in practice. Where the current interval between $I_f$ and $I_{2f}$ is less than 50 amps, as can occur with wires of less than 1/16 in. diameter, the limits of 1.1 $I_f$ and 0.9 $I_{2f}$ cross over in which case the preferred current lies between the lower and higher current values determined. Alternatively preferred limits can be specified as current peaks not less than 1.05 $I_f$ and not greater than 0.95 $I_{2f}$. However, it is generally more convenient to express the current limit in the equivalent way mentioned above that is in terms of $I_f$ alone as 1.1 $I_f$–1.4 $I_f$.

According to a second aspect of the present invention, a consumable electrode pulsed current welding system includes means for supplying to the welding arc a background current superimposed with pulses of higher amplitude, the value of the background current being insufficient to cause natural transfer of electrode material during the periods for which it is effective by itself and the peak values of the pulses lying between predetermined limits of $I_f$ and $I_{2f}$ defined in terms either of unmodulated current or of substantially square wave pulses as discussed above; and the system further includes a device for detecting the peak amplitude of the current pulses and means for effectively adjusting that amplitude.

According to a subsidiary feature of the invention, the peak amplitude of the current pulses in pulsed current arc welding is arranged to be such that the instants of transfer coincide with the periods during which the current applied to the welding arc is decreasing rapidly at the end of the pulses which caused those transfers. For example, with the approximately sinusoidal pulse shape such transfer is arranged to occur when the current has fallen to less than the value given by the average of the peak pulse current and the mean value of the background current. Such an arrangement achieves reasonably good arc stability and at the same time less violent detachment of the droplets than when detachment occurs when the amplitude of the pulse is nearer its peak value. However, in specific cases where the problem of stability is less serious, even less violent detachment may be achieved if the last moment of detachment occurs when the pulse current has ceased, that is the current has returned to the background or non-pulse level. It is believed that the possibility of a pulse production transfer that it has passed its peak value may be due to arc forces associated with the pulse current having urged the molten droplet forward in the detachment process with sufficient momentum for the detachment to be inevitable in spite of the virtual cessation of effective arc force towards the end of the pulse period when the current is rapidly reducing. In order to achieve such late transfer it is still necessary for the peak amplitude of the current pulse to be greater than $I_f$ but not much late transfer it is still necessary for the peak amplitude of the current pulse to be greater than $I_f$ but not much greater, using the same notation as above, suitable peak values lies within the limits of 1.1 $I_f$ to 1.2 $I_f$ for a particular electrode material and shielding gas combination. Depending on the metal/gas combination used the numerical value of $I_f$ will vary but the ratio of the preferred peak current amplitude to this characteristic value will be unchanged.

In a modified pulsed current welding system in which background current supplied to the welding arc is superimposed with higher current pulses with peak values between $I_f$ and $I_{2f}$, a device is provided which is responsive to the arc voltage for detecting the instants of transfer of droplets of electrode material together with means for adjusting the effective current value of the pulses in accordance with an indication of the instants of transfer provided by the detecting device Another factor to be considered as well as the most suitable pulse magnitude for a given pulse shape and duration is the interval between pulses or pulse repeat frequency. For a given rate of electrode feed, the pulse repeat frequency (presuming that the relation of 1 droplet transfer per pulse cycle is maintained) directly governs the volume of metal transferred or drop size. Preferably it is arranged that the transfer frequency is such that the diameter of spheres of the same volume as the droplets transferred is not less than half and not more than twice the diameter of the consumable electrode wire. This in turn implies that the average length of electrode wire associated with each transfer lies between the limits of $1/12$ and $5\frac{1}{3}$ times its own diameter These relationships can be expressed symbolically as follows:

$$\frac{1}{2} < D/d < 2 \text{ and } 1/12 < p < 5\frac{1}{3}$$

where D is the diameter of the theoretical spherical droplet and $d$ the electrode diameter and $p$ the ratio of the average length of wire per droplet to the electrode diameter.

Preferably $\frac{2}{3} < D/d < 1\frac{1}{2}$ and therefore: $16/81 < p < 2\frac{1}{4}$ or approx. $\frac{1}{5} < p < 2$.

In many cases a convenient size of droplet is that which has a volume equal to a sphere of diameter substantially the same as that of the parent electrode wire, that is the ratio $D/d$ is approximately unity and $p$ is about $\frac{2}{3}$. It is thus a desirable operating feature that, as well as limiting the pulse magnitude within the ranges discussed above, the pulse repeat frequency should also lie within the limits associated with particular drop volume relative to the wire size. The repeat frequency or transfer frequency is given by:

$$w/60\, pd$$

where $w$ is the electrode feed rate in inches/minute and $p$ the mean length of wire per droplet relative to the electrode diameter $d$.

In order that the invention may be more clearly understood, specific examples of welding systems embodying it will now be described with reference to the accompanying drawings, in which:

FIGURE 1 is a preferred circuit for detecting the occurrence of transfer of a droplet of electrode material;

FIGURE 2 represents the visual display produced on the face of an oscilloscope arranged to be responsive both to the pulsed waveform applied to the welding arc and to the output signal of a device for detecting the instants of transfer of droplets of electrode material;

FIGURE 3 shows diagrammatically an arrangement for adjusting the frequency of pulses applied to the welding arc in accordance with the rate of electrode feed and thus controlling the size of droplets transferred.

Figure 4:
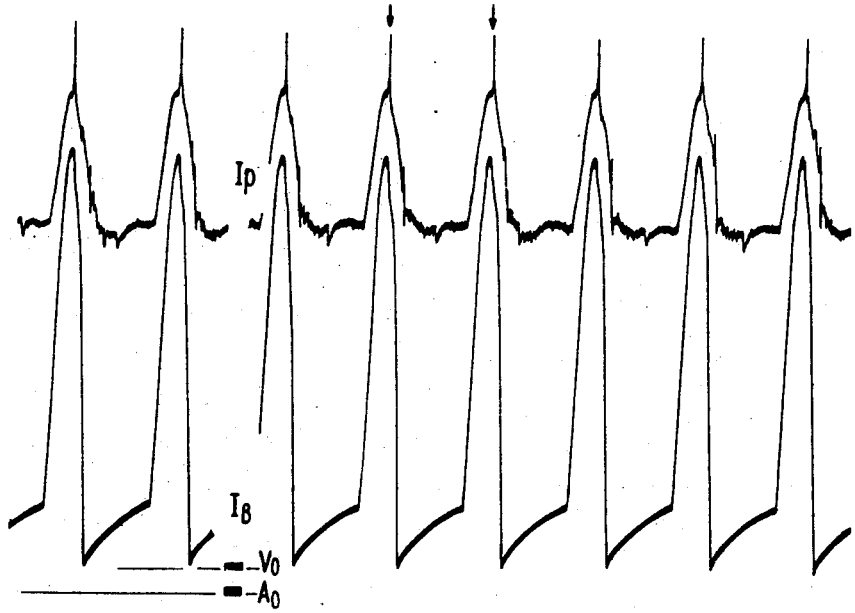
FIGURES 4, 5, and 6 are waveforms showing the pulse and background current of different magnitudes.

Both a method and welding systems embodying the present invention rely on the fact that we have discovered that limits for the peak values of pulsed currents to be supplied to the welding arc can be predetermined for a specific metal gas combination with reference to the operation of arcs of those combinations under unmodulated current conditions or with substantially square wave modulation. This greatly simplifies the selection of suitable peak values. Conventional methods may be employed for measuring frequencies of droplet transfer with varying levels of unmodulated current, the most convenient normally being to display a signal representing the arc voltage on an oscilloscope so that the instants of transfer show up as voltage spikes. Another method, also well known in the field of investigating consumable electrode welding, is to take a high speed cine-film of the operating arc itself so that the actual transfer of droplets is photographed and the frequency or the time interval may be determined from observation of the photographs and knowledge of the speed of operation of the camera. A convenient method of varying the unmodulated arc current during such measurements includes adjustment of the rate of electrode feed. The use of unmodulated current for determining the limits for the peak values of the pulsed current is satisfactory in connection with aluminium electrodes in argon and other commonly used electrodes of low resistance in predominately inert gas atmospheres. However, for more resistive electrodes such as mild steel electrodes it is preferable to employ the square wave pulse technique described. Provided the average current level of the pulses is insufficient to cause excessive melting of the electrode material and consequent distortion of the tip, the use of such a pulse technique may be considered as exactly equivalent to the use of unmodulated current. It is merely necessary to ensure that the duration of each pulse exceeds the duration of the pulses to be applied to the arc or that fraction of that duration under consideration. The amplitude of a square wave pulse causing a transfer separated from the instant of initiation of the pulse by an interval equal to the duration of a pulse to be applied to the arc corresponds to amplitude $I_t$ defined above with reference to unmodulated current and that producing a transfer in one half of that time corresponds respectively to $I_{2f}$. Identical methods may be employed for observing the instants of transfer using oscilloscopes or cine-photography provided the instants of initiation of the square wave pulses are also registered.

Typical unmodulated current amplitudes for examples of specific electrode gas combinations which provide specific transfer frequencies are given in the following table:

| Electrode material | Electrode diameter (inch) | Gas | Transfers/ sec. | Current amplitude (amps) |
|---|---|---|---|---|
| Aluminium | 1/16 | Argon | 150 | 215 |
| Do | 1/16 | do | 300 | 260 |
| Do | 3/64 | do | 150 | 175 |
| Mild steel | 3/64 | Argon 2% oxygen. | 150 | 260 |
| Stainless steel | 3/64 | do | 150 | 205 |
| Do | 3/64 | Argon | 150 | 235 |

Similar values determined using pulsed current of substantially square waveform are as follows:

| Electrode material | Electrode diameter (inch) | Gas | Separation of instant of transfer from initiation of pulse in millisec. | Pulse current amplitude (amps) |
|---|---|---|---|---|
| Aluminium | 1/16 | Argon | 7 | 210 |
| Do | 1/16 | do | 3½ | 270 |

From such values of $I_t$ as determined experimentally and the preferred range of peak pulse current as already given relative to $I_t$, the desired operating pulse current peak can be established. Preferably the pulse current is automatically adjusted or semi-automatically adjusted to cause transfer to occur towards the end of the pulse when the current is falling rapidly towards the background level. However, in cases where the instants of transfer are not so readily detected or in order to employ simpler apparatus the peak pulse current can be measured and adjusted in accordance with the values determined above. This adjustment could be carried out by an operator or automatically by a servo system with a peak current sensing input and the output operating either on the pulse supply system or the background current system as will be described to alter the pulse current output. Thus if the peak current falls below 1.1 $I_t$ the current is increased and if the peak current exceeds 1.4 $I_t$ the current is reduced accordingly.

Adjustment of the peak values of the pulses applied to the welding arc for a particular electrode gas combination may be achieved, for example, by providing means for adjusting the open circuit voltage of the pulse generator or its series impedance or, alternatively, by adjusting the amplitude of a background current supply on which the pulses are superimposed, an increase in the background current causing an increase in operating arc length and impedance and a consequent decrease in the current drawn from the pulse supply. In a third arrangement the effective value of the peak amplitude of the pulses could be adjusted by means of a gating arrangement which serves to prevent application of the leading portion of the pulse to the arc. Since the range of adjustment by such a method is limited and would normally serve only to provide a reduction in effective current value, it is convenient to arrange that a finite delay of application of the pulses occurs in normal operation so that adjustment may be provided in both senses.

The adjustment of the peak current values in systems embodying the present invention may be carried out manually in response to observation of an indication or may be carried out automatically by a servo system. The indication observed by an operator or to which such a servo system is responsive may either be a direct indication of the peak value or a corresponding derived value or, preferably, an indication of the instants of occurrence of transfers of droplets.

The peak values of the pulse current waveform supplied to the welding arc can be obtained from oscillograms of the operating pulse current arc but are more conveniently obtained by displaying the results of well known peak measuring methods. For example, the voltage across a current shunt or low resistor in series with the pulse current supply to the arc can be amplified and the peak detected by a simple diode circuit and stored by a capacitance, the voltage on which is measured and displayed say on a meter appropriately calibrated in current peak. Such a system could be readily devised by a well known method for the approximately sinusoidal type waveform or similar wave shapes in the current supplied to the arc. However, there may be minor fluctuations or spikes in the current in certain cases due either to the characteristics of the source supplying current to the arc or due to some feature in the arc such as for example, the momentary short circuiting of the molten tip to the work that can occur with short operating arc lengths where the short circuit causes an increase in the current and hence a higher peak. To allow for such eventualities it is preferred to measure the peak of the applied current pulse to the arc over a finite time sufficient to average out any such disturbances which could lead to less accurate measurement. Thus the current peak could be averaged over, say 2 milliseconds for a half wave sinusoidal type current pulse as obtained from a power supply of 50 cycles/second frequency. The averaging period can be increased or decreased as desirable according to the particular waveform and could be as little as one fifth or as much as a half of the pulse duration. However, for general purposes with near sinusoidal wave shapes an averaging period of about one third of the pulse duration (for example 2 milliseconds for a 7 millisecond total pulse duration) would be suitable. With such a damped measuring system the values indicated are of course less than the true peak of a simple sinusoidal type current pulse and the factors used to define the limits of the pulse current should preferably be amended accordingly. For example with a 50 cycles/second mains supply and a near sinusoidal current pulse of about 7 milliseconds total duration and with peak measuring device with an averaging time of about 2 milliseconds the indicated peak magnitude should not be less than say 0.85 $I_f$ and not more than 0.85 $I_{2f}$ or not less than 0.9 $I_f$ and not greater than 1.1 $I_f$. The relevant factors can be determined according to circumstance bearing in mind that the basis for prescribing the limits is the appropriate steady current at which the transfer frequency is given by the reciprocal of the pulse duration. Where the peak current is detected in a system with some averaging or time constant stage, these factors are further adapted in accordance with the expected ratio between the peak as detected $I_p$ and the instantaneous current peak $I_p'$. This further factor depends on the time constant of the detecting circuit relative to the pulse duration or the frequency of the mains supply. For example, with pulses of half sine waveform, where the time constant is $\frac{1}{10}$ of a pulse period, i.e. 1 millisecond for a 10 ms. pulse supply the ratio $I_p$ to $I_p'$ is 0.9, and for a relative time constant of 0.2 the ratio is 0.8 and for 0.4 the ratio is 0.66.

The instants of transfer of droplets where readily detected, such as with an aluminium in argon arc, for example, are accompanied by a sharp increase of voltage of the order of 1 to 15 v. in a time period of less than 1 millisecond. In these cases the transfer can be simply detected by a network designed to emphasize this short voltage change and discriminate against other and/or slower fluctations. An example of such a network is shown in FIGURE 1 and comprises a self biasing part including resistor R1 and capacitor C1 with a time constant T1 which follows the average arc voltage together with a part for indicating voltages δv. in excess of this average. A part of this excess above a predetermined minimum, introduced by using diodes D together with resistor R4 to provide a plateau which this excess voltage must exceed to be registered in the detecting system, is differentiated in a differentiating network including resistor R3 and capacitor C3 which has a time constant which may be 1 millisecond or less but not so short as to excessively attenuate the indicated sharp voltage increase. The output signal of the differentiator is applied to an indicating device which can, for example, be a storage circuit or simple pulse generator which gives one output for every indicated sharp voltage increase, i.e. occurrence of transfer in the arc. The output with amplification as required can be displayed on an oscilloscope in conjunction with the pulse current waveform or can be used to provide a marker on the waveform so that the instant of transfer with respect to the pulse current is clearly exemplified. Alternatively, the time between the initiation of the current pulse and the instant of transfer can be indicated and this time interval displayed. Since the pulse current duration with the sinusoidal type waveform is predetermined to a large extent a priori, and is of the order of $\frac{2}{3}$ of $\frac{1}{2}$ cycle period of the mains supply, the preferred time interval to the instant of transfer is also known and can be taken for example as 1 millisecond less than the current pulse duration. Such a setting ensures that the transfer occurs at the instant when the current pulse is falling rapidly and returning to the background current level.

There are other arc voltage fluctuations which could also be detected by such a simple system and which are not necessarily indicative of transfer. For example, if short circuiting occurred (which is generally not desirable) there are major voltage increases from short circuit to arcing voltage levels at the rupture of the short circuit. These can be discriminated against by arranging a pre-biased voltage to charge the averaging part of the network to say, 20 v. In addition, a further biasing arrangement could be employed based on relatively long term average arc voltage with a time constant given by resistor R2 and capacitor C2. Thus, with these pre-biased voltages in the first network described above, the sharp voltage increase indicating transfer to be detected must occur at a level in excess of the preset voltage, e.g. 20 v. or the long term average arc voltage (from the network including resistor R2 and capacitor C2) which ever is the greater. Typical values that can be employed are a time constant of the order of 0.1 sec. for the long term prebiased voltage with R2, C2 100 ohms and 1,000 µf. respectively and a time constant of 0.01 sec. for the average arc voltage network with R1, C1 100 ohm and 100 µf. respectively. The value of resistor R4 is 1k. ohm and those of capacitor C3 and resistor R3 of the detecting of differentiating network for feeding a suitable display or timing system 0.1 µf. and 10k. ohms respectively.

Using the detecting system described above or any other suitable detecting system for indicating the instants of transfer with respect to the pulse current, the current can be adjusted either manually or automatically so that the instants of transfer occur towards the end of the sinusoidal type current pulse. A servo system to provide automatic adjustment would on the one hand sense the instant of transfer and, in particular, the instant relative to the pulse current and/or its duration, and on the other hand operate on a control to alter the effective pulse current amplitude. Thus, if the transfer occurs earlier than desired, i.e. the time interval between the start of the current pulse and the instant of transfer, is such that the transfer occurs while the current is relatively high then the effective pulse current is reduced. Conversely, if the transfer occurs later than desired for stability or even after the pulse current has ceased the system could increase the effective pulse output until the transfer is occurring while the current is falling rapidly towards the background lever.

One example of a convenient display is shown in FIGURE 2. The instant of transfer as detected is used to produce a brightened area 10 on the trace 11 displayed by a cathode ray oscilloscope. The display may be observed by an operator who adjusts manual controls to vary the peak current value of the pulses accordingly, or, in a servo arrangement the sensing can be accomplished by means of photo cells arranged to give an increase signal if the transfer occurs later than desired and conversely a decrease signal if the transfer occurs earlier. In order to reduce the tendency to hunt in such a system the sensing can be made to have a dead space over the desired operating range 12 indicated by broken lines so that only when the transfer occurs outside this dead range does this servo system introduce a correction. Alternatively instead of utilising a cathode ray oscilloscope display the servo can be based on the time interval between the initiation of the current pulse and the instant of transfer and this time interval suitably gated or detected such that the effective pulse current is adjusted only when the transfers occur earlier or later than desired or preferably earlier and later than a desired range. For example, if the transfer occurs within the period of 0–5 milliseconds from the start of the current pulse, the servo operates to reduce the effective pulse current. While if the transfer occurs in a time period greater than 6½ milliseconds from the start of the current pulse (in the case of a sinusoidal type pulse current derived from a mains supply at 50 cycles/sec. where the overall pulse duration is of the order of 7 milliseconds) then the servo operates to increase the effective pulse current. Again such a servo operation can either alter the current progressively on command from its sensing system at a uniform rate or preferably the rate of correction be increased for an increase in the error signal so that a more rapid correction of current can be achieved without an excessive tendency to hunting.

The servo system controlling the effective pulse current can operate either via an electro mechanical link or electrically. In the former case, the servo system includes a motor with on/off and reversing controls governed by the sensing input and which operates on a control affecting for example the open circuit voltage via a variable transformer or the series impedance or even the control for the background current as in the case of a transductor controlled transformer rectifier supply. Alternatively the current adjustment can be accomplished in the case of the transductor controlled background supply by electric or solid state circuits governing the current in the control winding of the transductor. Yet again the servo system can reduce the effective pulse current by delaying the initiation of the sinusoidal type current pulse by means, for example, of gated or controlled rectifier. In this case in place of the simple transformer and diode system a silicon controlled rectifier can be utilised both for the diode and for the delayed switching on.

Although the pulse repeat frequency can be selected in accordance with the above considerations so that the transferred drop volume as a sphere has a diameter substantially equal to that of the wire, it is convenient to arrange for the pulse repeat frequency to alter with the wire feed speed. This can conveniently be accomplished, for example, by an index on the wire feed drive such that a signal is generated for every unit length of wire feed forward, e.g. a distance of ⅔ the wire diameter or any other distance within the limits proposed to give drop volumes equal to that of spheres not much larger and not much smaller than the wire diameter. Since the pulse repeat frequencies are closely linked with the power supply for a simple sinusoidal type ½ wave pulse current source, the index signal cannot directly initiate the current pulse. However, the indexing signal is preferably used to open a gate in a suitable system which permits the next available sinusoidal current pulse to be applied to the welding arc, pulses generated by the pulse source being inoperative except when the gate is opened by the indexing signal. An example of a suitable gating arrangement is illustrated in FIGURE 3. A 3-phase ½ wave transformer supply includes silicon controlled rectifiers in series with each transformer winding, in place of the simple diodes, so that each phase can be connected to supply the welding arc as desired by triggering the corresponding controlled rectifier. Each controlled rectifier is turned on (preferably towards the beginning of the ½ cycle generated in its series connected winding) by a grid pulse derived in synchronism with the phase concerned, but the firing pulse is delayed until a gate operated by index mechanism controlled by the wire feed is opened. A more detailed description of a 3-phase ½ wave system is illustrated in U.S. Patent No. 3,249,735. This arrangement permits average frequencies other than simple multiples and sub-multiples of the mains supply to be applied to the welding arc since the triggering of the sinusoidal current pulse does not necessarily occur at regular intervals but from time to time individual pulses may be spaced closer or further apart by intervals differing from the average by one or more pulse durations. For example, in a 3-phase ½ wave system derived from a 50 cycle mains supply, where the pulse repeat frequency would be 50 if every third possible pulse were initiated, an average pulse repeat frequency of approximately 43/second could be obtained by arranging that third and fourth pulses generated by the supply are gated alternately to the arc.

The index associated with the wire feed drive can comprise a simple make/break contact or series of contacts or more conveniently be derived as shown in FIGURE 3, by means of a mask 15 interposed between a light source 16 and a photosensitive element 17. The mask 15 can be changed as desired for different wire diameters and different length of wire/transfer. On rotation, the mask causes a series of impulses to be generated by the photo sensitive element 17 which after amplification and pulse shaping by well known methods in circuits 18 and 19 operate a suitable gate 20 in the main current pulse control system. As the wire feed speed is altered over a range, the frequency of current pulses will alter albeit not smoothly but in steps according to the combinations of repeat frequencies available and the impulses derived from the index system so that to a large extent the drop size is maintained within the desired limits. As previously stated, the pulse repeat frequency is given by: $w/60pd$, where $w$ is the electrode feed rate in inches/minutes and $p$ is the mean length of wire per droplet relative to the electrode diameter $d$. Thus in a particular example if it is desired that the drop volume should be that of a sphere equal to the wire in diameter, represented by $p=\frac{2}{3}$ then for a $\frac{3}{64}$ inch diameter wire feeding at 60 inches per minute the calculated frequency would be 32 transfers per second. Although a frequency of 33½ pulses per second can be derived from a 50 cycle supply, in practice it might be more convenient to use either 50 pulses per second or 25 pulses per second, the former giving droplets slightly smaller and the latter slightly larger than the optimum but within the range of ⅔ to 1½ times the wire diameter. The drop size, or more particularly the size of the equivalent sphere, does not alter greatly with a moderate change in repeat frequency since the drop diameter is a function of the cube root of the frequency for a given electrode feed rate.

Frequencies which are readily generated from a simple half wave source are 1, ½, ⅓, ¼, ⅕ etc. of the mains supply frequency. These can be doubled using a full wave or diametric type source for the fundamental generation of current pulse, and possible frequencies for a 50 cycle source would then be 100, 50, 33½, 25, 20 etc. Using a three phase supply the basic frequencies of the simple ½ wave system can be trebled giving frequencies for a 50 cycle supply of 150, 75, 50, 37½ etc. Using the gating system described in connection with FIGURE 3 a much wider range of frequencies is available enabling more precise adjustment of the droplet size.

Figure 5:
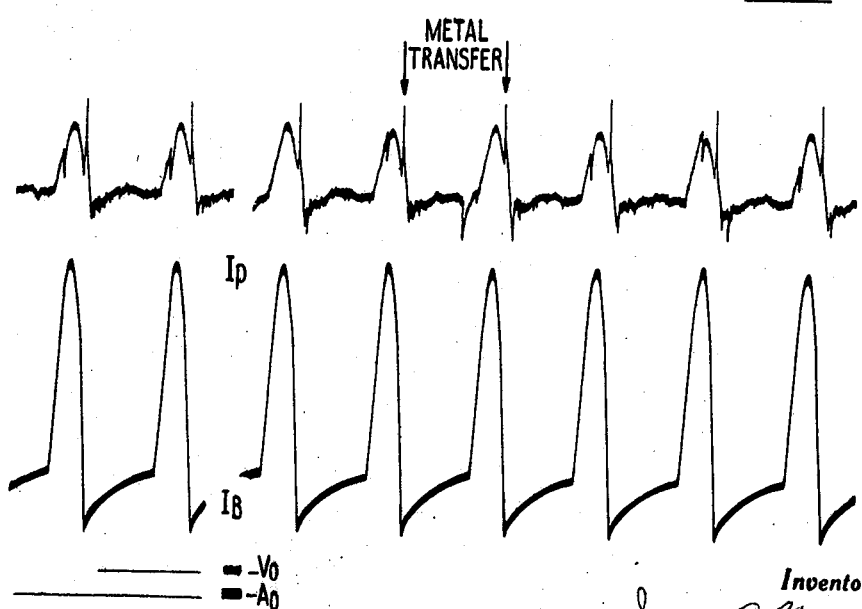
Figure 6:
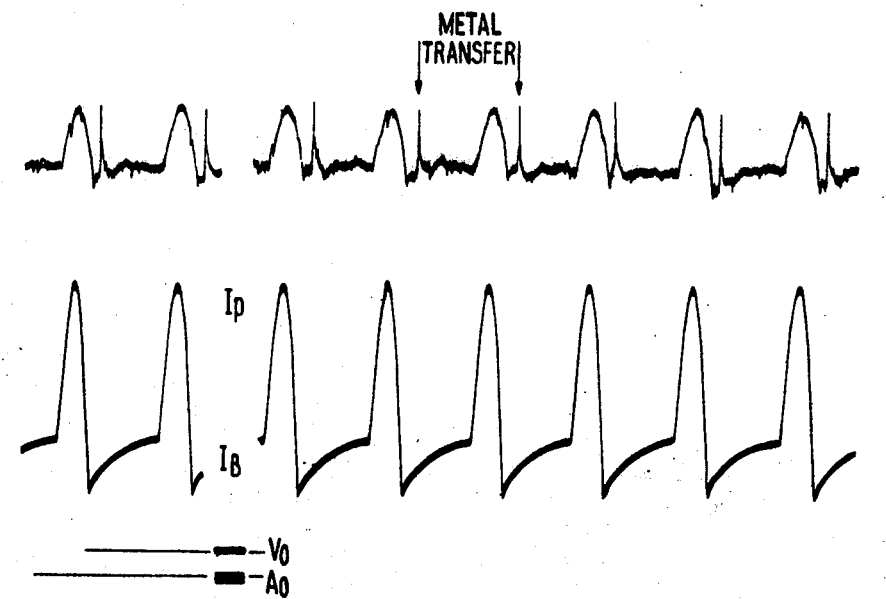

Referring now to FIGURES 4, 5 and 6, in each case the lower waveform is that of the arc current and the upper waveform that of the arc voltage. In each case, thin spikes can be seen on the arc voltage waveform indicating the currents of metal transfer.

In FIGURE 4 it will be seen that the primary metal transfer occurs at the metal peak. The current is, however, low enough to avoid the occurrence of more than one transfer per pulse. In FIGURE 5 it will be seen that the spike on the voltage waveform indicating a metal transfer occurs on the decaying part of the pulse current waveform which is close to the optimum condition. In FIGURE 6, transfer occurs in the background current period after the pulse has ceased although it is the momentum imparted to the droplet by the forces associated with the pulse which is responsible for the transfer.

What we claim is:

1. A method of consumable electrode spray transfer welding comprising supplying to a welding arc a background current supplemented by current pulses having a distinguishable peak, the background current being insufficient to cause natural transfer in the periods for which the background current alone is operative, the method including adjusting the magnitude of the peak value of the current pulses to lie within a range of which the minimum and maximum values are equal to first and second amplitudes of unmodulated currents that would produce a natural transfer of droplets separated by average intervals equal, respectively, to the duration of the current pulses and to one half of that duration, whereby for each pulse a single transfer occurs at a time following the first two-thirds of the pulse duration.

2. A method in accordance with claim 1, in which the welding arc is supplied with constant polarity current pulses substantially of part-sinusoidal shape and in which the said minimum and maximum values are equal, respectively, to 1.1 times and 1.4 times the said first amplitude of unmodulated current.

3. A method of consumable electrode spray transfer welding, comprising supplying to a welding arc a background current supplemented by current pulses having a distinguishable peak, the background current being insufficient to case natural transfer in the periods for which the background current alone is operative, the method comprising adjusting the magnitude of the peak value of the current pulses to lie within a range of which the minimum and maximum values are equal to first and second amplitudes of a pulse of substantially square waveform that could cause transfer of a droplet after intervals, beginning with the initiation of the square waveform, which are equal respectively to the duration of the current pulse to be applied to the welding arc and to one half of that duration, whereby for each pulse a single transfer occurs at a time following the first two-thirds of the duration of the current pulse.

4. A method according to claim 3, in which the current pulses are of constant polarity and are substantially of part-sinusoidal shape, and in which the said minimum and maximum values are equal respectively to 1.1 times and 1.4 times the said first amplitude of the pulse of square waveform.

5. A method according to claim 3 in which the welding arc is supplied with current pulses in which the magnitude of the peak value of the current pulses is arranged to be at a value such that instants of transfers of droplets of the electrode material occur after the termination of the successive pulses of current applied to the welding arc which cause those transfers.

6. A method according to claim 3, in which the relationship of the pulse repeat frequency to the rate of electrode feed is such that the ratio of the diameter of a spherical droplet of mass substantially equal to that of the individual droplets transferred to the diameter of the electrode lies between ½ and 2.

7. A method according to claim 6, in which the relationship of the pulse repeat frequency to the electrode feed rate is such that the said ratio lies between ⅔ and 1½.

8. A consumable electrode pulsed current welding system, including means for supplying to the welding arc a background current superimposed with pulses of higher amplitude, the value of the background current being insufficient to cause transfer of electrode material during the periods for which it is effective by itself and the peak values of the pulses lying between a minimum value equal to the amplitude of unmodulated current that would produce natural transfer of droplets in which the transfer of successive droplets would be separated on the average by an interval equal to the duration of the current pulses and a maximum value equal to the amplitude of unmodulated current which would produce a natural transfer of droplets on the average at twice the frequency produced by an unmodulated current with an amplitude equal to the minimum value; the system further including a device for detecting the peak amplitude of the current pulses and means for effectively adjusting that amplitude.

9. A consumable electrode pulsed current welding system, including means for supplying to the welding arc a background current superimposed with pulses of higher amplitude, the value of the background current being insufficient to cause transfer of electrode material during the periods for which it is effective by itself and the peak values of the pulses lying between a minimum value equal to the amplitude of unmodulated current that would produce natural transfer of droplets in which the transfer of successive droplets would be separated on the average by an interval equal to the duration of the current pulses and a maximum value equal to the amplitude of unmodulated current which would produce a natural transfer of droplets on the average at twice the frequency produced by an unmodulated current with an amplitude equal to the minimum value; the system further including a device responsive to the arc voltage for detecting the instants of transfer of droplets of electrode material and means for adjusting the effective current value of the pulses in accordance with an indication of the instants of transfer provided by the detecting device.

10. A consumable electrode pulsed current welding system, including means for supplying to the welding arc a background current superimposed with pulses of higher amplitude, the value of the background current being insufficient to cause natural transfer of electrode material during the periods for which it is effective by itself and the peak values of the pulses lying between a minimum value equal to the amplitude of a pulse of substantially square waveform that would produce transfer of a droplet at an instant separated from the instant of initiation of the square wave pulse by an interval equal to the duration of the current pulses to be applied to the welding arc and a maximum value equal to the amplitude of a pulse of substantially square waveform that would produce transfer of a droplet at an instant separated from the instants of initiation of the square wave pulse by an interval equal to a half of the duration of pulses to be applied to the welding arc; the system further including a device for detecting the peak amplitude of the current pulses and means for effectively adjusting that amplitude.

11. A system according to claim 10, including means for introducing a predetermined correction dependent on the time constant of the device for detecting the peak current amplitude and the characteristics of the pulsed waveform supplied to the welding arc to compensate for the difference between the peak value as determined by that device and the true instantaneous peak value of the current pulses.

12. A system according to claim 10, in which the means for adjusting the effective current value of the pulses serves to vary the amplitude of the pulses supplied to the welding arc and superimposed on the background current.

13. A system according to claim 10, in which the means for adjusting the effective current value of the pulses serves to adjust the level of the background current supplied to the welding arc.

14. A system according to claim 10, in which the means for adjusting the effective current value of the pulses serves to delay the instant of application of the current pulses to the welding arc, only portions of the pulse after that instant being applied to the arc.

15. A system according to claim 10, further including a device responsive to the rate of feed of the consumable electrode for adjusting the pulse repeat frequency so that the mass of the droplets transferred corresponds to the mass of a sphere of electrode material having a diameter between a half and twice the diameter of the electrode.

16. A system according to claim 15 including means for generating a series of constant polarity pulses and in which the means responsive to the rate of electrode feed controls gating means for applying a selection of the said constant polarity pulses to the welding arc superimposed on the background current supplied to that arc.

17. A consumable electrode pulsed current welding system, including means for supplying to the welding arc a background current superimposed with pulses of higher amplitude, the value of the background current being insufficient to cause natural transfer of electrode material during the periods for which it is effective by itself and the peak values of the pulses lying between a minimum value equal to the amplitude of a pulse of substantially square waveform that would produce transfer of a droplet at an instant separated from the instant of initiation of the square wave pulse by an interval equal to the duration of the current pulses to be applied to the welding arc and a maximum value equal to the amplitude of a pulse of substantially square waveform that would produce transfer of a droplet at an instant separated from the instants of initiation of the square wave pulse by an interval equal to one half of the duration of pulses to be applied to the welding arc; the system further including a device responsive to the arc voltage for detecting the instants of transfer of droplets of electrode material and means for adjusting the effective current value of the pulse in accordance with an indication of the instants of transfer provided by the detecting device.

18. A system according to claim 17, in which the device for detecting the instants of transfer includes self biasing means responsive to the average arc voltage together with means responsive to the self biasing means and the arc voltage for detecting when the arc voltage exceeds the average arc voltage by more than a predetermined amount.

19. A system according to claim 17, including means responsive to the instants of initiation of the pulses supplied to the welding arc and to the output signal of the detecting device for providing an indication of the instants of occurrence of transfers relative to the pulses causing those transfers.

20. A system according to claim 17, including gating means responsive to the instants of initiation of the pulse of the input waveform to the welding arc and to the instants of transfer of droplets and providing an indication when the interval between these instants does not lie within a predetermined range.

21. A system according to claim 17, including an oscilloscope responsive both to the pulsed waveform supplied to the welding arc and to the output signal of the detecting device for providing a visual display of the instants of occurrence of transfers relative to the pulses causing those transfers.

22. A system according to claim 21, including light sensitive means responsive to the visual display on the oscilloscope arranged to detect the instants of occurrence of transfer relative to the pulsed waveform and generate a signal for controlling the means for adjusting the effective current value of the pulses.

References Cited

UNITED STATES PATENTS

| | | | |
|---|---|---|---|
| 3,051,828 | 8/1962 | Manz | 219—131 |
| 3,071,680 | 1/1963 | Anderson et al. | 219—131 |
| 3,346,799 | 10/1967 | Aldenhoff | 219—131 X |
| 3,361,892 | 1/1968 | Spencer | 219—131 |
| 3,365,564 | 1/1968 | Boughton | 219—131 |
| 3,370,151 | 2/1968 | Normando | 219—131 |

JOSEPH V. TRUHE, Primary Examiner

C. L. ALBRITTON, Assistant Examiner

U.S. Cl. X.R.

219—131